US011683336B2

(12) United States Patent
Prusov et al.

(10) Patent No.: US 11,683,336 B2
(45) Date of Patent: *Jun. 20, 2023

(54) SYSTEM AND METHOD FOR USING WEIGHTING FACTOR VALUES OF INVENTORY RULES TO EFFICIENTLY IDENTIFY DEVICES OF A COMPUTER NETWORK

(71) Applicant: AO Kaspersky Lab, Moscow (RU)

(72) Inventors: Evgeny E. Prusov, Moscow (RU);
Andrey A. Kiryukhin, Moscow (RU);
Dmitry N. Satanin, Moscow (RU);
Dmitry S. Lukiyan, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,268

(22) Filed: May 9, 2022

(65) Prior Publication Data

US 2022/0263857 A1     Aug. 18, 2022

Related U.S. Application Data

(63) Continuation of application No. 16/823,541, filed on Mar. 19, 2020, now Pat. No. 11,356,468.

(30) Foreign Application Priority Data

Sep. 30, 2019   (RU) .......................... RU2019130602

(51) Int. Cl.
*G06F 15/173*     (2006.01)
*H04L 9/40*       (2022.01)
(Continued)

(52) U.S. Cl.
CPC .......... *H04L 63/1433* (2013.01); *G06F 8/65* (2013.01); *H04L 41/0853* (2013.01);
(Continued)

(58) Field of Classification Search
CPC ............ H04L 63/1433; H04L 63/0876; H04L 63/1416; H04L 63/20; G06F 8/65
(Continued)

(56) References Cited

U.S. PATENT DOCUMENTS 10,831,856 B1 * 11/2020 Tkach .................... G06F 16/958
2002/0168178 A1 * 11/2002 Rodriguez ......... H04N 21/4147
386/293
(Continued)

*Primary Examiner* — Liang Che A Wang
(74) *Attorney, Agent, or Firm* — ArentFox Schiff LLP; Michael Fainberg

(57) ABSTRACT

A method for using inventory rules to identify devices of a computer network includes intercepting data traffic across one or more communication links of the computer network. The intercepted data traffic is analyzed to determine whether one or more of a plurality of inventory rules is satisfied by the intercepted data traffic. Each of the plurality of inventory rules comprises one or more conditions indicating the presence of a particular computer network device having a set of parameters. Each one of the plurality of inventory rules has a weighting factor value indicative of a priority of the application of a corresponding rule. The weighting factor value depends on previously identified devices. One or more devices of the computer network are identified using the weighting factor value of the one or more satisfied inventory rules.

17 Claims, 5 Drawing Sheets

(51) Int. Cl.
*G06F 8/65* (2018.01)
*H04L 41/0853* (2022.01)
*H04L 41/0866* (2022.01)
*H04L 41/12* (2022.01)

(52) U.S. Cl.
CPC .......... *H04L 41/0866* (2013.01); *H04L 41/12* (2013.01); *H04L 63/0876* (2013.01); *H04L 63/1416* (2013.01); *H04L 63/20* (2013.01)

(58) Field of Classification Search
USPC .......................................... 709/224, 225, 226
See application file for complete search history.

(56) References Cited

U.S. PATENT DOCUMENTS

| | | | |
|---|---|---|---|
| 2008/0077705 A1* | 3/2008 | Li | H04L 47/2441 709/236 |
| 2013/0276053 A1 | 10/2013 | Hugard et al. | |
| 2014/0173739 A1 | 6/2014 | Ahuja et al. | |
| 2015/0341282 A1* | 11/2015 | Bar-On | H04L 67/61 709/203 |
| 2017/0288965 A1 | 10/2017 | Cebere | |
| 2017/0336849 A1* | 11/2017 | Harper | G06F 1/3209 |
| 2018/0316676 A1* | 11/2018 | Gilpin | H04L 63/20 |
| 2019/0021005 A1* | 1/2019 | Stan | H04L 67/12 |
| 2019/0102487 A1* | 4/2019 | Desai | G06F 30/20 |
| 2019/0210005 A1* | 7/2019 | Shoulders | C07K 17/06 |

\* cited by examiner

SYSTEM AND METHOD FOR USING WEIGHTING FACTOR VALUES OF INVENTORY RULES TO EFFICIENTLY IDENTIFY DEVICES OF A COMPUTER NETWORK

CROSS REFERENCE TO RELATED APPLICATIONS

The present application is a continuation of prior U.S. patent application Ser. No. 16/823,541, filed Mar. 19, 2020, which claims priority to Russian Patent Application No. 2019130602 filed on Sep. 30, 2019, the entire content of which is incorporated herein by reference.

FIELD OF TECHNOLOGY

The present disclosure relates to the field of computer networking, and, more specifically, system and method for using weighting factor values of inventory rules to efficiently identify devices of a computer network.

BACKGROUND

In the world of mass use of computer devices, such as desktop and portable personal computers and smartphones, tablets, and other mobile devices, various types of computer threats have become widespread. Examples of computer threats are network worms, Trojan programs, key loggers, ransomware, computer viruses and computer attacks. The computer attacks can be further classified into directed attacks (also known as targeted attacks—TA) and complex attacks (Advanced Persistent Threats—APT) on a cyber-physical system (CPS) and an information system. An information system is an aggregate of computing devices and the communications used for their interconnection, also known as a corporate infrastructure. Hackers may have various goals from the simple theft of personal data of employees to industrial espionage. Oftentimes, hackers have information about the architectures of corporate networks, the principles of the internal document flow, the means used to protect the networks and the computer devices or any other information specific to the information system. This information allows the hackers to get around the existing means of defense, which oftentimes do not possess the flexibility in their settings to meet all the needs of the information system.

Modern computer networks (especially a CPS network) typically include a plurality of devices—controllers, sensors, actuators and other network nodes. Many of the devices may utilize obsolete software, containing known vulnerabilities. Given the presence of a variety of complex and at least partially obsolete technological equipment, the process of updating the software for such equipment requires a lot of time and resources. At least in some cases, updating such obsolete software may not even be possible due to the halting of support by the manufacturer. Therefore, in order to assure the security of the CPS network, it may be necessary to create an inventory of the network equipment in order to search for and remove the vulnerabilities of the computer devices on a higher level, such as the gateway level. The term "equipment inventory" or simply "inventory" as used herein refers broadly to identification of the devices connected to the network and also the attributes/parameters of these devices (including, but not limited to, versions of the operating system, firmware, software, and the like). Furthermore, the equipment inventory provides the network administrators with complete and accurate data on the equipment being used by the network and the network services, for the purpose of ensuring security of the network.

There are at least two known methods of generating the inventory of a computer network. The first method, known as network scanning, employs active network interaction with the network objects. However, this approach involves risks of interrupting the running processes of the equipment, such as, for example the CPS controllers (PLCs). In this example, the PLCs may receive information from the control equipment and sensors as to the state of the object of control. In response to receiving this information, the PLCs may act on the actuators. The PLCs are not programmed to interact with other network objects. Therefore, upon receiving an inventory request from the system, the execution of instructions by the PLC may be interrupted and may require an intervention by an operator to reboot the PLC or update its firmware. The second method, known as passive analysis of the network traffic to gather information about the CPS devices, addresses the risks inherent in an active (network scanning) analysis. However, this approach also has a number of shortcomings, such as the low level of determination of the attributes of the CPS network devices.

Thus, there is a need for more efficient identification of the computer network devices and/or identification and determination of device attributes/parameters.

SUMMARY

Aspects of the disclosure relate to the field of computer networking.

Aspects of the disclosure are designed to use inventory rules to identify network device and to identify/determine parameters associated with the identified network devices.

The technical result of the disclosure is the more efficient identification of network devices.

In one exemplary aspect, a method for using inventory rules to identify devices of a computer network includes intercepting data traffic across one or more communication links of the computer network. The intercepted data traffic is analyzed to determine whether one or more of a plurality of inventory rules is satisfied by the intercepted data traffic. Each of the plurality of inventory rules comprises one or more conditions indicating the presence of a particular computer network device having a set of parameters. Each one of the plurality of inventory rules has a weighting factor value indicative of a priority of the application of a corresponding rule. The weighting factor value depends on previously identified devices. One or more devices of the computer network are identified using the weighting factor value of the one or more satisfied inventory rules.

In one aspect, the set of parameters includes at least a device identifier parameter and wherein the device identifier parameter includes at least one of: a MAC address of the device and an IP address of the device.

In one aspect, the plurality of inventory rules are written in a formal language.

In one aspect, the formal language comprises YAML.

In one aspect, analyzing the plurality of inventory rules to determine whether the one or more of the plurality of inventory rules is satisfied further comprises searching at least one of the header portion and the payload portion of the plurality of data packets for values matching values of corresponding parameters contained in the plurality of inventory rules.

In one aspect, the plurality of inventory rules includes at least: i) a vendor rule listing one or more network addresses associated with each of the plurality of devices; ii) an asset rule configured to search for digital signatures identifying one or more devices and one or more parameters associated therewith; iii) a protocol rule configured to search for digital signatures to identify one or more network protocols being used by the intercepted data traffic; and iv) a fingerprint rule configured to determine one or more device parameters using digital fingerprints.

In one aspect, identifying one or more devices of the computer network further comprises identifying the one or more devices of the computer network only if a combined value of the weighting factor values of the one or more satisfied inventory rules is greater than a predefined threshold.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
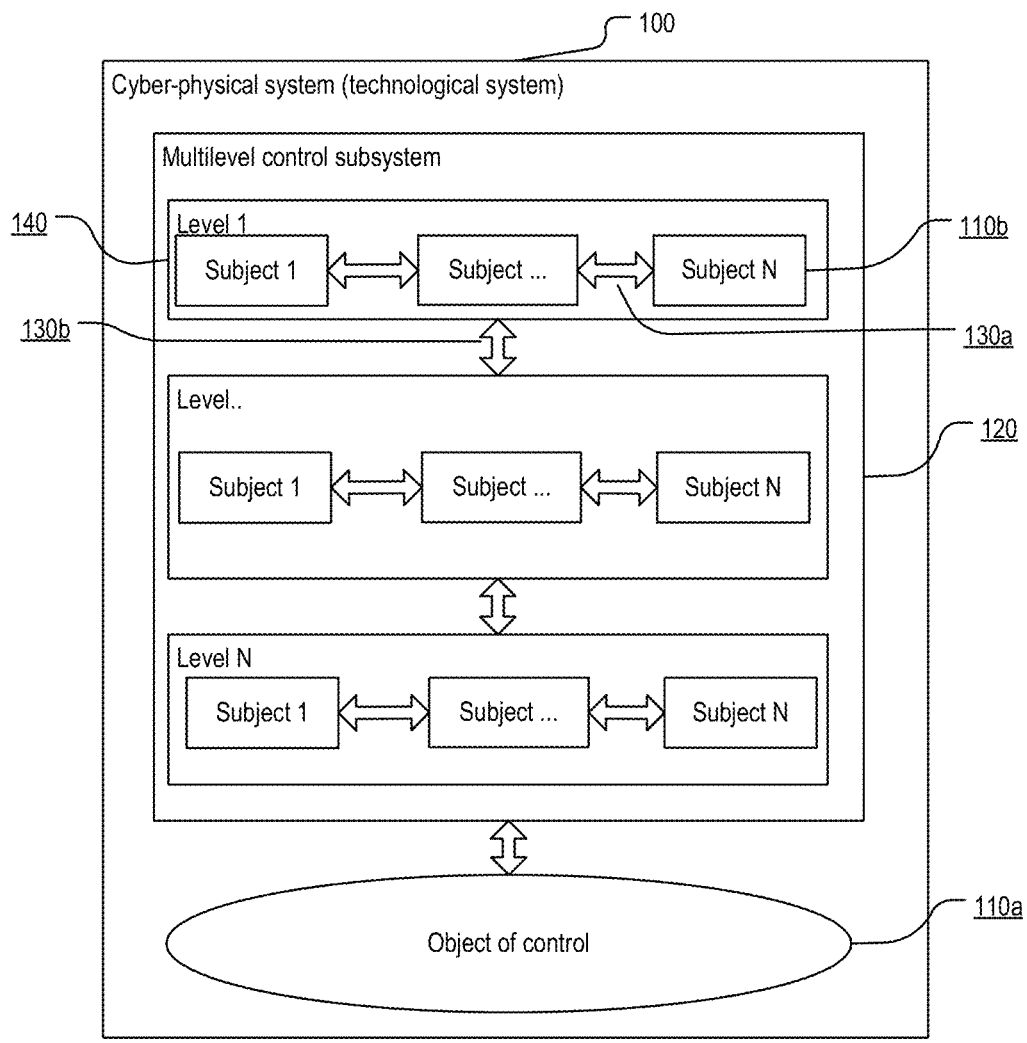
FIG. 1a schematically illustrates an example of a technological system in which aspects of the present invention can be implemented.

Exemplary aspects are described herein in the context of a system, method, and computer program product for using inventory rules to identify devices of a computer network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts that will be used in describing variant aspects of the present disclosure will now be introduced.

The term "Indicators of compromise, IOC", also known as "indicators of infection", refers to artifacts or residual features of an intrusion in an information system, observable on a computer or in a network. Typical indicators of compromise may include antivirus records which have been triggered, unknown Internet Protocol (IP) addresses, check sums of suspicious files, Uniform Resource Locators (URLs) of suspicious web sites, domain names of command centers of botnets, and the like. A number of standards exist for indicators of compromise, including, but not limited to: OpenIOC, STIX, CybOX, etc.

The term "an event in an information system security system" (hereafter referred to as simply an event) refers to a detected state of a system, a service or a state of a network indicating a possible violation of the information system security policy, a violation or failure of the means and measures of monitoring and control, or a previously unknown situation which may be relevant to the security of information system.

The term "an information security incident" (hereafter referred to as simply an incident) refers to one or more unwanted or unexpected events which are likely to compromise the operations of a business and create threats to information system's security.

The term "an object of control" refers to a technological object subjected to external actions (controlling and/or perturbing) for the purpose of changing state of such technological object. In an aspect, such objects of control may include a device (such as, for example, an electric motor) or a technological process (or a portion thereof).

The term "a technological process (TP)" refers to a process of material production, consisting of a sequential changes of states of a material entity (the object of work).

The term "control of a technological process (process control)" refers to a set of methods used to control the process variables during the production of an end product.

The term "control loop" refers to material entities and control functions needed for the automated regulation of the values of the measured process variables to the values of desired setpoints. A control loop may contain detectors, sensors, controllers, and actuators.

The term "process variable, PV" refers to a current metered value of a particular portion of a TP which is being observed or monitored. A process variable might be, for example, a measurement from a sensor.

The term "a setpoint" refers to a value of a process variable which is to be maintained.

The term "a manipulated variable (MV)" refers to a parameter which is regulated so that the value of a process variable is maintained at the setpoint level.

The term "an external action" refers to a method of changing the state of an element subjected to the action (such as an element of a technological system (TS)) in a particular direction, the action being transmitted from one element of the TS to another element of the TS in the form of a signal.

The term "state of an object of control" refers to the totality of its essential attributes, as expressed by parameters of state which are altered or maintained under the influence of external actions, including control actions from a control subsystem.

The term "a parameter of state" refers to one or more numerical values characterizing an essential attribute of an object. In one aspect, the parameter of state is a numerical value of a physical quantity.

The term "a formal state of an object of control" refers to the state of the object of control corresponding to the process chart and other technological documentation (in the case of a TP) or a traffic schedule (in the case of a device).

The term "a controlling action" refers to a deliberate (the goal of the action is to act on the state of the object), legitimate (provided for by the TP) external action on the part of the control subjects of a control subsystem on an object of control, resulting in a change of state of the object of control or resulting in preserving the state of the object of control.

The term "a perturbing action" refers to a deliberate or unintentional illegitimate (not provided for by the TP) external action on the state of an object of control, including an action on the part of the control subject.

The term "control subject" refers to a device which applies a controlling action to an object of control or transmits a controlling action to another control subject for transformation before being applied directly to the object of control.

The term "a multilevel control subsystem" refers to a collection of control subjects that involves several levels.

The term "a cyber-physical system (CPS)" refers to an information system concept of integration of computing resources into physical processes. In such a system, the sensors, equipment, and information systems are connected along the entire chain of value creation beyond the boundaries of a single enterprise or business. These systems can interact with each other by means of standard Internet protocols for forecasting, self-tuning, and adapting to changes. Examples of a CPS are a technological system, the Internet of Things (including wearable devices), and an industrial Internet of Things.

The term "Internet of Things (IoT)" refers to a computer network of physical objects ("things") equipped with built-in technologies for interacting with each other or with the outer world. The Internet of Things includes such technologies as wearable devices, electronic systems of means of transportation, smart cars, smart cities, industrial systems, and the like.

The term "an industrial Internet of Things (IIoT)" refers to equipment connected to the Internet and expanded analytics platforms which perform a processing of data obtained from the connected devices. The devices of the IIoT may be quite diverse—from small weather sensors to complex industrial robots.

The term "a technological system (TS)" refers to a functionally interrelated group of control subjects of a multilevel control subsystem and an object of control (a TP or a device). In a technological system a change in state of the object of control is realized through a change in state of the control subjects. The structure of the technological system is formed by the basic elements of the technological system (the interconnected control subjects of the multilevel control subsystem and the object of control), as well as the communication links between these elements. In the event that the object of control in the technological system is a technological process, the objective of the control is to change the state of the work object (raw material, machining blanks, etc.) by causing a change in the state of the object of control. In the event that the object of control in the technological system is a device, the objective of the control may be to change the state of the device (a means of transportation, a spacecraft, and the like). The functional relationship of the elements of the TS generally means a relationship of the states of these elements. There might not even be a direct physical link between the elements. For example, a physical link between actuators and a technological operation may be absent. However, for example, the cutting speed of a spindle may be functionally related to the rotational speed of a spindle, even though these parameters of state are not physically connected.

The term "state of a control subject" refers to the totality of essential attributes of the control subject, expressed by the parameters of states which can be altered or maintained under the influence of external actions.

The term "essential attributes of a control subject" (and accordingly the essential parameters of state) refers to attributes having a direct influence on the essential attributes of the state of the object of control. The essential attributes of the object of control may be attributes having a direct influence on the functional factors being controlled (precision, safety, efficacy) for the TS. Examples of essential attributes may include, but are not limited to: cutting conditions corresponding to formally specified conditions, the movement of a train corresponding to its itinerary, the process of maintaining a reactor temperature within permissible ranges. Depending on the factors being controlled, the parameters of state of the object of control may be selected and accordingly related parameters of state of the control subjects exerting a controlling action on the object of control can be selected.

The term "the state of an element of a technological system" refers to the state of the control subject and the object of control.

The term "real state of an element of a technological system" refers to the state of an element of a technological system at a certain time of action on the object of control, determined by measuring the parameters of state and intercepting signals (traffic) between the elements of the TS. The measurement of the parameters of state may be performed, for example, using sensors installed in the TS.

The term "real state of a technological system" refers to the totality of interrelated real states of the elements of the technological system.

The term "a cybernetic block" refers to an element of a cyber-physical monitoring system, monitoring the process of operation of the element of the technological system.

The term "state space" refers to a method of formalizing a change in states of a dynamic system (a technological system or a cyber-physical system).

The term "a computer attack" (also referred to hereafter as a cyber attack) refers to a targeted action on information systems and computer telecommunication networks by hardware and software, carried out in order to breach the information security in these systems and networks.

The term "a directed attack" (also referred to hereafter as a targeted attack, TA) refers to a particular instance of a computer attack, directed against a specific organization or a specific individual.

The term "SIEM (Security Information and Event Management) systems" refers to means designed to control the information security in organizations as a whole and to manage events obtained from various sources. SIEM systems are capable of analyzing events arriving from network devices and various applications in real time.

FIG. 1a shows schematically an example of a technological system (TS) comprising: the object of control 110a; the control subjects 110b that may configured to form a multilevel control subsystem 120; horizontal communication links 130a and vertical communication links 130b. The control subjects 110b may be grouped by levels 140.

Figure 1B:
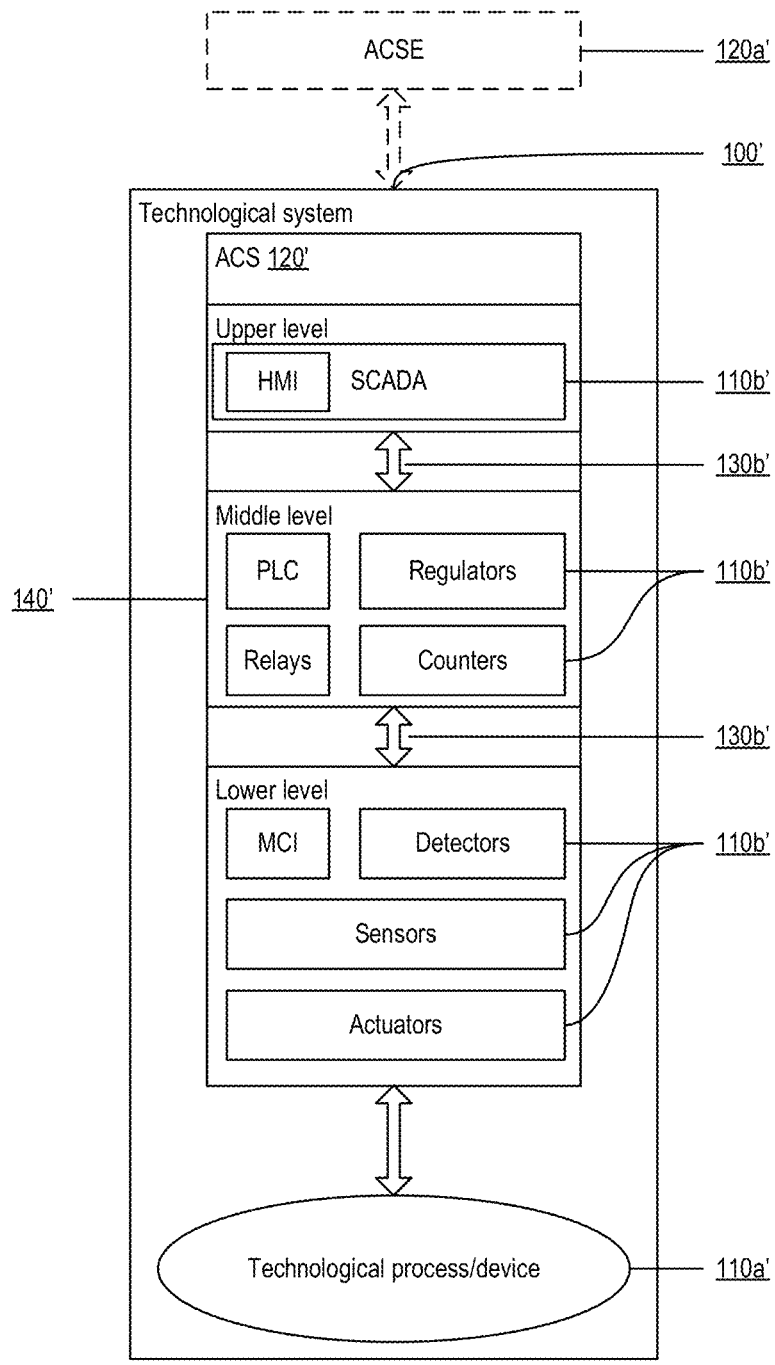
FIG. 1b schematically illustrates a more detailed example of a technological system in which aspects of the present invention can be implemented.

FIG. 1b shows schematically a more detailed example of the implementation of a technological system 100'. The object of control 110a' may be a TP or a device. In an aspect, controlling actions may be dispatched to the object of control 110a' by an automated control system (ACS) 120'. The ACS 120' may have three levels 140' consisting of the control subjects 110b' interrelated to each other both on the horizontal level by horizontal communication links (links within the same level, not shown in FIG. 1b) and on the vertical level by vertical communication links 130b' (links between different levels of the ACS system). The relationships between the control subjects 110b' may be functional. In other words, in the general case, a change in state of a control subject 110b' on one level may elicit a change in the states of the control subjects 110b' connected to it on the same level and/or on any other level. Information about the change in state of the control subject 110b' may be transmitted in the form of a signal along the horizontal communication links and/or vertical communication links 130*b*' established between the control subjects 110*b*'. Put differently, information on the change in state of the particular control subject 110*b*' is an external action with respect to the other control subjects 110*b*'. The levels 140' within the ACS 120' may be identified in accordance with the purpose of the control subjects 110*b*'. The number of levels may vary, depending on the complexity of the automated control system 120'. Simple technological systems may contain one or more lower levels. In an aspect, wired networks, wireless networks, and integrated microcircuits may be used for physical connections between the elements of the TS (110*a*', 110*b*') and the subsystems of the TS 100. In an aspect, Ethernet, industrial Ethernet, or any of a variety of industrial networks may be used for the logical linkage between the elements of the TS (110*a*', 110*b*') and the subsystems of the TS 100. The industrial networks and the protocols make use of various types and standards: Profibus, FIP, ControlNet, Interbus-S, DeviceNet, P-NET, WorldFIP, LongWork, Modbus among many others.

The uppermost level (the level of supervisory control and data acquisition, SCADA) may be the level of dispatcher/operator control including at least the following control subjects 110*b*': controllers, control computers human-machine interfaces (HMI) (in FIG. 1*b* shown in the context of one SCADA control subject). This level may be intended for tracking the states of the elements of the TS (110*a*', 110*b*'), obtaining and accumulating information on the state of the elements of the TS (110*a*', 110*b*') and correcting these when needed. The middle level (the CONTROL level) may be the level of the controllers, including at least the following control subjects: programmable logic controllers (PLC), counters, relays, regulators. The control subjects 110*b*' of the type "PLC" may receive information from the control subjects of "measurement and control equipment" type and from the control subjects 110*b*' of "sensor" type as to the state of the object of control 110*a*'. The control subjects of type "PLC" may work out (create) a control action in accordance with a programmed control algorithm for the control subjects of "actuator" type. The actuators may directly carry out this action (by applying it to the object of control) at the lower level. In an aspect, an actuator may be a part of an actuating device (equipment). Regulators, such as PID regulators (proportional-integral-derivative controller or PID controller) may be a device in a control loop with feedback. The lower level (the Input/Output level) may be the level of such control subjects as: sensors and measuring devices monitoring the state of the object of control 110*a*', as well as actuators. Actuators may directly act on the state of the object of control 110*a*' to bring it into compliance with the formal state, i.e., the state corresponding to the technological assignment, the technological chart or another technological documentation (in the case of a TP) or the traffic schedule (in the case of a device). On this level, there may occur the coordination of signals from the control subjects 110*b*' of "sensor" type with the inputs of the control subjects of the middle level, and the coordination of the control actions worked out by the control subjects 110*b*' of "PLC" type with the control subjects 110*b*' of "actuator" type, which implement these actions. As noted above, an actuator may be a part of an actuating device. An actuating device may move a regulating element in accordance with signals arriving from a regulator or control device. Actuating devices may be the last connection in the chain of automatic control and general may consist of the blocks:

an amplifying device (contactor, frequency converter, amplifier, and so on);

an actuator (electric, pneumatic or hydraulic drive) with feedback elements (sensors of the output shaft position, signaling of end positions, manual drive, and so forth);

a regulating element (valves, gates, flaps, dampers and so forth).

Depending on the application conditions, actuating devices may have different designs. The main blocks of the actuating devices usually include the actuators and regulating elements.

In an aspect, the actuating device as a whole may be called an actuator.

Figure 2:
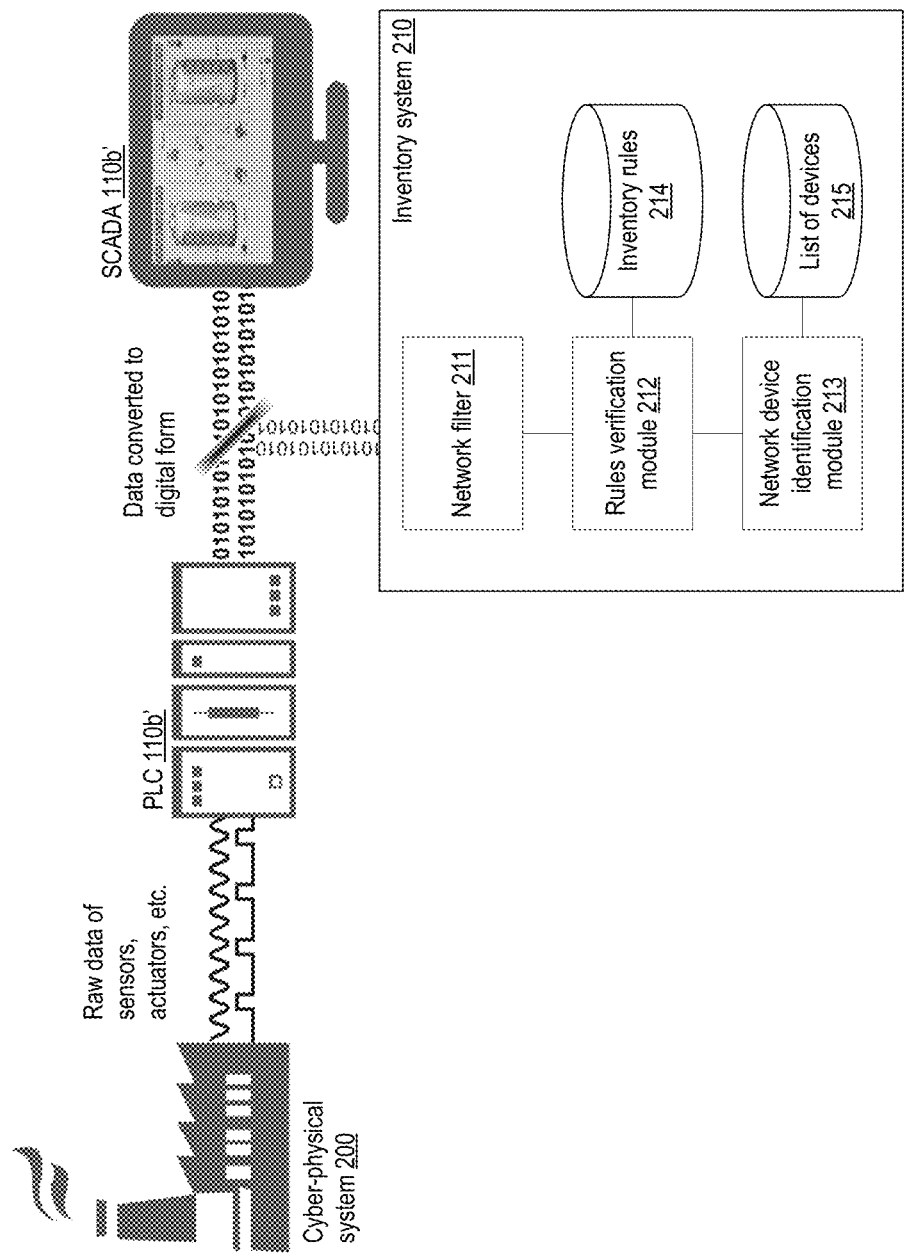
FIG. 2 shows a diagram of the system for using inventory rules to identify devices of a computer network, in accordance with aspects of the present disclosure.

FIG. 2 shows an exemplary implementation of a system for using inventory rules 210 to identify devices of a computer network (hereinafter, an inventory system). In the illustrated example, the inventory system 210 may be a component of a cyber-physical system (CPS) 200. In an aspect, the inventory system 210 may be configured to employ passive analysis of the intercepted data traffic to collect and accumulate information about the various devices of the corresponding computer network (in the given example, the computer network of the CPS 200). In an aspect, the network filter 211 of the inventory system 210 may be configured to intercept the data traffic. The network filter 211 may be configured to intercept every data packet exchanged between the PLC 110*b*' and SCADA 110*b*' components and may be configured to send the intercepted packets to the rules verification module 212 for verification purposes. In an aspect, the intercepted data traffic may include network packets including network, transport and application layer data. In an aspect, the network filter 211 may be configured to intercept data traffic across one or more communication link layers (e.g. transport layer, network layer or data link layer according to OSI model) of the computer network for a range of IP addresses. Each data packet comprises a packet header portion and a payload portion.

In an aspect, the rules verification module 212 may be configured to analyze a plurality of inventory rules to determine whether any of the inventory rules 214 is satisfied by the intercepted data traffic. In an aspect, the plurality of inventory rules may be kept, for example, in a database of inventory rules 214. Each of the plurality of inventory rules may include conditions indicating the presence of a particular computer network device having a particular set of parameters/attributes. In other words, each inventory rule may contain conditions which, if satisfied, indicate the presence in the computer network of the CPS 200 of a network device with given parameters. In an aspect, each inventory rule may have a weighting factor value associated therewith. The weighting factor value may depend on previously identified devices of the computer network. In an aspect, the weighting factor value of each inventory rule determines the priority of the application of the rule.

In an aspect, the network device identification module 213 may be configured to identify one or more devices of the computer network and the parameters associated with the identified devices using the satisfied inventory rule(s). In an aspect, during identification process, the network device identification module 213 may be configured to consider the weighting factor value of each satisfied inventory rule. In an aspect, the network device identification module 213 may be configured to store data about the identified devices in a special database, for example, a database containing a list of devices 215.

In an aspect, the rules verification module 212 may be configured to search the header portion and/or the payload portion of the plurality of intercepted data packets for values matching values of corresponding parameters contained in the plurality of inventory rules. Optionally, the rules verification module 212 may include a payload data inspector to implement one or more (payload) data inspection techniques; or may otherwise utilize one or more Deep Packet Inspection (DPI) techniques. The DPI technique is known in the art, and the details will not be described for the sake of brevity. In an aspect, if the rules verification module 212 determines that one or more inventory rules are satisfied, the network device identification module 213 may identify one or more devices of the computer network and the parameters associated with the identified devices using the satisfied inventory rule(s). Such device parameters may include, but are not limited to:

a) the device identifier;
b) the device name;
c) the device model;
d) the device type;
e) the security status;
f) the manufacturer;
g) the protocol;
h) the characteristics of the installed Operating System (OS);
i) the characteristics of the installed software.

The device identifier parameter may be used to provide clear identification of the device. The device identifier parameter may include, for example, the MAC address of the device, the IP address of the device, or a combination of these addresses. In various aspects, any other unique device identifier can be used as the device identifier parameter.

The network device identification module 213 can be configured to determine the device name parameter using, for example, NetBIOS Name Service (NBNS), Domain Name Resolution (DNS) and/or other protocols.

The device type parameter may include one of the following: HMI/SCADA, relay protection, server, workstation, PLC, engineering station, mobile device, or any other network device.

The security status parameter may be an indicator of the presence or absence of critical and major security events. The security status may take on one of the following exemplary values:

Critical value—indicating that at least one critical event involving the device is detected. For example, the security status may contain critical value if an uncorrected vulnerability is known for the corresponding device.

Warning value—indicating that at least one event involving the device is present that is likely to affect the security of the device, yet such effect on the device may not be critical. For example, the security status may contain the warning value indicating that the latest version of the operating system or firmware might has not been installed on the device, yet no critical vulnerabilities are detected on the device.

Secure value—indicating an absence of critical and warning security events.

As noted above, the database of inventory rules 214 may contain a plurality of inventory rules. In yet another aspect, the database of inventory rules 214 may contain the following exemplary and non-limiting inventory rules for identification of a device and the corresponding device parameters:

a. A vendor rule that utilizes lists of MAC addresses and/or IP addresses of known devices.

b. An asset rule configured to search for digital signatures identifying one or more devices and one or more parameters associated therewith. This rule may enable the network device identification module 213 to determine particular device parameters, such as, but not limited to the device model, the version of the firmware on the device, the software and/or hardware version numbers, the OS version identifier, information about services provided by the device, among other parameters.

c. A protocol rule may be configured to search for digital signatures to identify one or more network protocols being used by the intercepted data traffic. The protocol rule may be a particular case of the asset rule that may be used for identification of a network protocol.

d. A fingerprint rule configured to determine one or more device parameters using digital fingerprints. In one aspect, a plurality of generated TCP/IP fingerprints may be utilized by the fingerprint rule. As used herein, the term "fingerprint generation" denotes defining a fingerprint based on a rule, particularly, a process of generating a fingerprint of an network device using an IP scan result and a service scan result. That is, a Transmission Control Protocol (TCP)/IP packet-based Operating System (OS) fingerprint may be generated using an IP scan result, and a service banner-based service fingerprint may be generated using a service scan result. As used herein, the term "service scan" denotes scanning ports corresponding to an IP address that is determined as being active based on an IP scan result. That is, a service scan involves determining whether ports of a particular IP address are currently providing a service. The number of ports to be service-scanned is not particularly limited. In one aspect, the fingerprint rule may enable the network device identification module 213 to determine such device parameters as the device model and the operating system.

In an aspect, if a device parameter has been identified by at least two different inventory rules, the inventory rule having a largest weighting factor value is selected for device identification purposes. For example, the asset rule may have a weighting factor value equal to 90, which may be greater than the weighting factor value of the vendor rule (for example, 20). Accordingly, if the network device identification module 213 identifies the device and the device parameters using the vendor rule and the asset rule, the asset rule (having the largest weighting factor value) may get a priority for device identification purposes. In one example, this situation may arise due to the fact that the vendor rule is less accurate than the asset rule. For example, in a network having a plurality of routers, the MAC address or the IP address might identify not the device itself, but rather the router by which the subject device is connected to the network. In contrast, the asset rule may allow identification of the device itself and a corresponding device parameter, such as the device manufacturer, for example.

In an aspect, if a device parameter has been identified by at least three different inventory rules, whereby at least two different inventory rules identify an identical value for that device, then the network device identification module 213 may add these values up. For example, if the inventory rule A (having weighting factor value of 30) and the inventory rule B (having weighting factor value of 40) have determined the OS of the device as being Windows 10, while the inventory rule C (having weighting factor value of 50) has determined the OS of the device as being Windows 7, the network device identification module 213 may use inventory rules A and B, since their combined weighting factor value of 70 is higher than the weighting factor value of rule C (50).

And thus the network device identification module 213 may determine the OS of the device as being Windows 10 in the given example.

In yet another aspect, at least two of the mentioned inventory rules may be satisfied using different network traffic data pertaining to the same device. For example, one rule may be satisfied by analyzing network layer data, while another rule may use transport layer data.

As noted above, in one aspect, the weighting factor value of each inventory rule may depend on previously identified devices of the computer network and the parameters of those devices. For example, if a particular rule was used to identify a particular device with specific parameters, and an analyst confirmed the correctness of the device identification, The weight of this particular rule can be increased accordingly.

In yet another aspect, the weighting factor value may depend on the topology of the computer network. For example, if the topology of the computer network is a bus, i.e., there are no routers in the network, then the asset rule and the vendor rule may either be assigned identical values of the weighting factor, or the vendor rule will be assigned a larger weighting factor value than the asset rule. In the second case, the operating speed of the system represented in FIG. 2 may be increased, since the asset rule will not be verified when the vendor rule is satisfied.

In an aspect, in the event of a changing of the inventory rules or the adding of new inventory rules, the rules verification module 212 may be configured to verify the altered or accordingly the new inventory rules by analyzing the same network traffic on which the altered inventory rule was satisfied. Thus, the proposed system and method of identification of the devices of a computer system using inventory rules enables identification of new devices of the computer network and their parameters immediately after adding new inventory rules or after making changes to the pre-existing inventory rules.

In another aspect, the rules verification module 212 may be configured to verify the satisfaction of inventory rules in decreasing order of the weighting factor value of the respective inventory rules. In yet another aspect, at the first satisfaction of an inventory rule, the rules verification module 212 may halt the further analysis of the intercepted network traffic and may halt further verification of the inventory rules. Once at least one inventory rule is satisfied, the network device identification module may be configured to identify at least one device of the computer network and the parameters of that device according to the satisfied inventory rule and taking into account the weighting factor value associated with that rule. Thus, at first, the rules verification module 212 may check the highest priority rules (with the largest weighting factor value), and may not even check the low priority rules (with lowest weighting factor values). Advantageously, this feature may improve the efficiency of the system.

In one aspect, upon satisfaction of at least one inventory rule, the network device identification module 213 may identify at least one device of the computer network and the parameters of that device according to each fulfilled inventory rule, if the combined value of the weighting factors of all those satisfied inventory rules is greater than a predefined threshold. Thus, if the combined weighting factor value of the satisfied rules is lower than the predefined threshold, the network device identification module 213 may not identify the device of the computer network at all. This functionality may reduce the number of errors of the first kind when the devices of the computer network or their parameters are identified falsely by low priority rules. Accordingly, the accuracy of the identification of the device parameters of the computer network may be increased.

In an aspect, the aforementioned threshold may be specified by the network device identification module 213 using one of the following methods:
a) individual threshold for each inventory rule;
b) joint threshold for all of the inventory rules;
c) joint threshold for a group of rules, where the groups of rules contain at least two inventory rules which identify the same device of the computer network or parameters of the same device of the computer network.

In an aspect, the network filter 211 may be configured to intercept network traffic from only new devices not previously identified. The data regarding the previously identified devices may be placed by the network device identification module 213, for example, on the list of devices database 215.

In an aspect, the inventory rules may be written in a formal language, one example of which is YAML. An example of the vendor rule is below:

```
id: 4
confidence: 20
vendor_mac_list: ['00:13:d5', '94:b8:c5', '00:0a:dc']
host: {vendor: HostVendor_Rugged, key: src_mac}
```

This rule identifies a device whose manufacturer (the host field) is HostVendor_Rugged, provided that the MAC address of the device is contained in the list vendor_mac_list. The device will be assigned the identifier id=4 and a weighting factor value (confidence value)=20.

An example of the asset rule is below:

```
id: 13009
confidence: 90
message: "Siemens Siprotec Model"
protocols: [goose]
prefilter: {pattern: "^.{8}\\x61.+7(SD|SA|UT|SJ|VK|VE)(4|5|6|8)\\d\\d?", flags: "Hsi"}
host: {type: HostType_Plc, vendor: HostVendor_Siemens, key: src_mac}
asset: {
type: hardware,
key: AssetKey_Model,
pattern: "(7[A-Za-z][A-Za-z]\\d\\d\\d?)",
# ParamLoc_PlcModel_Siprotec_Param1 = 'SIPROTEC ' + $p0
param_loc: ParamLoc_PlcModel_Siprotec_Param1}
```

This rule may be used for data of the protocol GOOSE (the protocols field), the prefilter field will contain a template to search for a match of the condition of the rule in the network data layer. The host field describes the network device which is the source of the network traffic in which the rule was satisfied (this device may be a router or a device which needs to be identified). In the given example, the device type is PLC, the manufacturer (vendor) is Siemens, the device address (key) is the MAC address of the device. The asset field specifies the device and the device parameters that will be identified by the rule. The asset field may contain values such as type (the type of information extracted from the network traffic; in the given example, information about the hardware) and pattern (a template for extracting from the network traffic the necessary information after performing the prefiltering for that rule). The value of param_loc may contain the result of the information extracted from the network traffic.

An example of the protocol rule is below:

```
id: 200006
confidence: 75
message: "RDP Protocol"
protocols: [tcp]prefilter: {pattern: "rdpdr.*cliprdr.*rdpsnd", flags: "Hsi"}
asset: {type: software, key: AssetKey_CommonProto, description: CommonProto_Rdp_OverTcp}
```

In this example, the protocol rule utilizes the TCP layer data, with the indicated prefilter, upon satisfaction of which the protocol RDP (Remote Desktop Protocol) may be identified.

An example of the fingerprint rule is below:

```
id: 15000005
confidence: 50
message: "General Electric C60/B30 (SYN+ACK)"
ip_flags: [ ]ttl: [[27, 30]]
tcp_flags: [syn, ack]
tcp_win_size: [[4096]]
tcp_options: [mss]
eth_padding: "(ether[padding_offset:2] == 0x8888)"
host: {type: HostType_Plc, vendor: HostVendor_GE, key: src_ip}asset: {type: hardware, key: AssetKey_Model, description: PlcModel_GeneralElectric_C60_B30}
```

The condition for satisfaction of this rule may be parameters of the ttl protocol in the range from 27 to 30, the presence of the flags syn, ack, a size of the TCP protocol window (tcp_win_size) equal to 4096, and also the presence of the transport layer option mss (maximum segment size). Moreover, the analyzed data of the network traffic should satisfy the BPF filter eth_padding.

Figure 3:
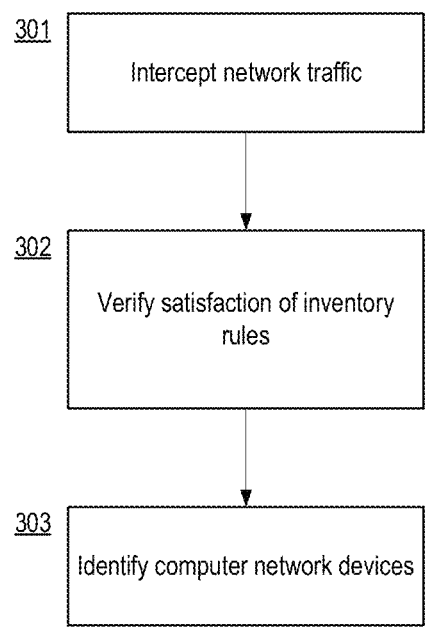
FIG. 3 shows a flowchart of the method for using inventory rules to identify devices of a computer network, in accordance with aspects of the present disclosure.

FIG. 3 shows a flowchart of the method for using inventory rules to identify devices of a computer network, in accordance with aspects of the present disclosure. In step 301, the network filter 211 may intercept network traffic. The network filter 211 may be configured to intercept every data packet exchanged between the PLC 110b' and SCADA 110b' components and may be configured to send the intercepted packets to the rules verification module 212 for verification purposes. In an aspect, the intercepted data traffic may include network packets including network, transport and application layer data. Each data packet comprises a packet header portion and a payload portion.

Next, in step 302, the rules verification module 212 may analyze the intercepted network traffic to determine whether any of the inventory rules is satisfied by the intercepted data traffic. In an aspect, the plurality of inventory rules may be kept, for example, in a database of inventory rules 214. Each of the plurality of inventory rules may include conditions indicating the presence of a particular computer network device having a particular set of parameters/attributes. In other words, each inventory rule may contain conditions which, if satisfied, indicate the presence in the computer network of the CPS 200 of a network device with given parameters. In an aspect, each inventory rule may have a weighting factor value associated therewith. The weighting factor value may depend on previously identified devices of the computer network. In an aspect, the weighting factor value of each inventory rule determines the priority of the application of the rule.

In response to one or more inventory rules being satisfied, in step 303, the network device identification module 213 may identify one or more devices of the computer network and the parameters associated with the identified devices using the satisfied inventory rule(s). In an aspect, during identification process, the network device identification module 213 may consider the weighting factor value of each satisfied inventory rule. In an aspect, the network device identification module 213 may store data about the identified devices in the database containing a list of devices 215. The particular exemplary aspects described above for the system in FIG. 2 are also applicable to the present method.

Thus, the proposed system and method enable a solution of the technical problem involving the low level of identification of the network device parameters and provides the technical result, namely, increases the accuracy of the identification and/or determination of the network device parameters using inventory rules and taking into account corresponding weighting factor values.

Figure 4:
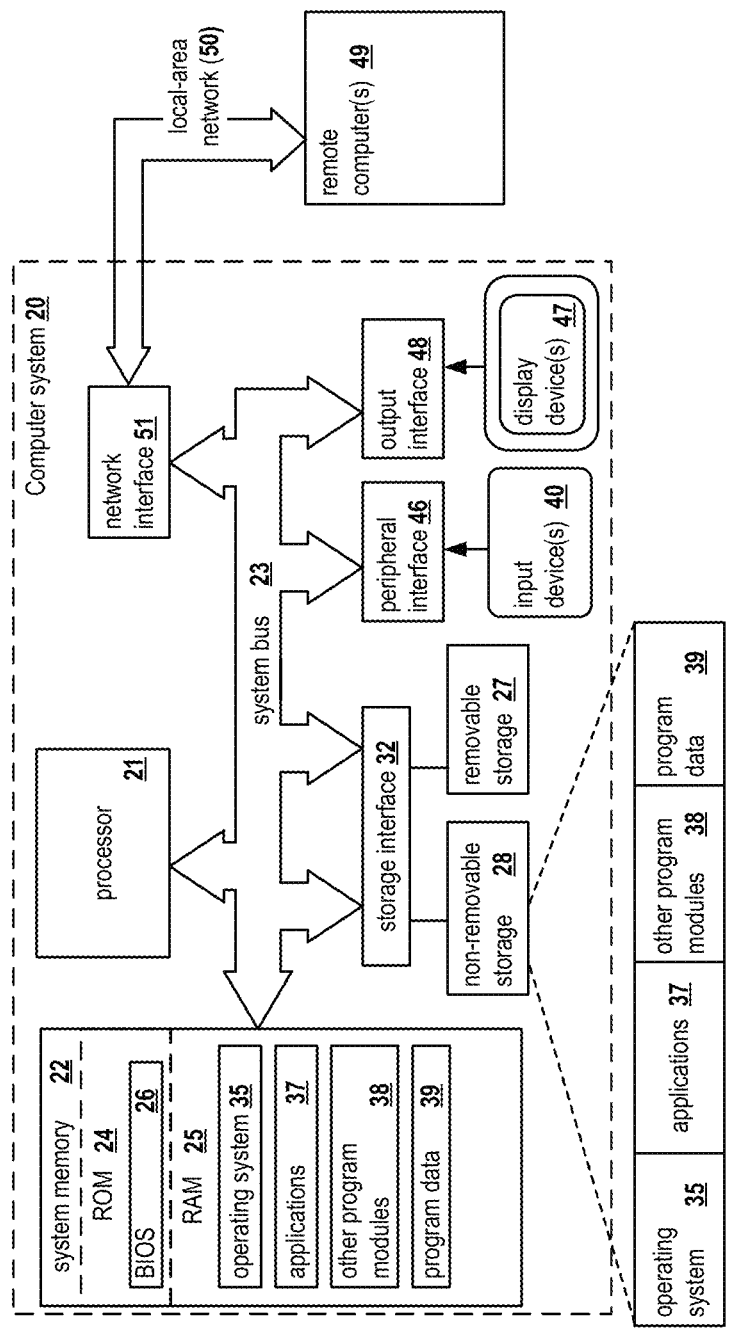
FIG. 4 shows an example of a general-purpose computer system.

FIG. 4 is a block diagram illustrating a computer system 20 on which aspects of systems and methods for detection of malicious files may be implemented in accordance with an exemplary aspect. The computer system 20 may represent the inventory system 210 from FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for using inventory rules to efficiently identify devices of a computer network, the method comprising:
   intercepting data traffic across one or more communication links of the computer network;
   analyzing the intercepted data traffic to determine whether one or more of a plurality of inventory rules is satisfied by the intercepted data traffic, wherein each of the plurality of inventory rules comprises one or more conditions indicating the presence of a particular computer network device having a set of parameters, wherein each one of the plurality of inventory rules has a weighting factor value indicative of a priority of the application of a corresponding rule and wherein the weighting factor value depends on previously identified devices;
   identifying one or more devices of the computer network using the weighting factor value of the one or more satisfied inventory rules; and
   wherein the plurality of inventory rules includes at least two of: i) a vendor rule listing one or more network addresses associated with each of the plurality of devices; ii) an asset rule configured to search for digital signatures identifying one or more devices and one or more parameters associated therewith; iii) a protocol rule configured to search for digital signatures to identify one or more network protocols being used by the intercepted data traffic; and iv) a fingerprint rule configured to determine one or more device parameters using digital fingerprints.

2. The method of claim 1, wherein the set of parameters includes at least a device identifier parameter and wherein the device identifier parameter includes at least one of: a MAC address of the device and an IP address of the device.

3. The method of claim 1, wherein the plurality of inventory rules are written in a formal language.

4. The method of claim 3, wherein the formal language comprises YAML.

5. The method of claim 1, wherein analyzing the plurality of inventory rules to determine whether the one or more of the plurality of inventory rules is satisfied further comprises searching at least one of the header portion and the payload portion of the plurality of data packets for values matching values of corresponding parameters contained in the plurality of inventory rules.

6. The method of claim 1, wherein identifying one or more devices of the computer network further comprises identifying the one or more devices of the computer network only if a combined value of the weighting factor values of the one or more satisfied inventory rules is greater than a predefined threshold.

7. A system for using inventory rules to efficiently identify devices of a computer network, the system comprising:
   a hardware processor configured to:
      intercept data traffic across one or more communication links of the computer network;
      analyze the intercepted data traffic to determine whether one or more of a plurality of inventory rules is satisfied by the intercepted data traffic, wherein each of the plurality of inventory rules comprises one or more conditions indicating the presence of a particular computer network device having a set of parameters, wherein each one of the plurality of inventory rules has a weighting factor value indicative of a priority of the application of a corresponding rule and wherein the weighting factor value depends on previously identified devices;
      identify one or more devices of the computer network using the weighting factor value of the one or more satisfied inventory rules; and
      wherein the plurality of inventory rules includes at least two of: i) a vendor rule listing one or more network addresses associated with each of the plurality of devices; ii) an asset rule configured to search for digital signatures identifying one or more devices and one or more parameters associated therewith; iii) a protocol rule configured to search for digital signatures to identify one or more network protocols being used by the intercepted data traffic; and iv) a fingerprint rule configured to determine one or more device parameters using digital fingerprints.

8. The system of claim 7, wherein the set of parameters includes at least a device identifier parameter and wherein the device identifier parameter includes at least one of: a MAC address of the device and an IP address of the device.

9. The system of claim 7, wherein the plurality of inventory rules are written in a formal language.

10. The system of claim 9, wherein the formal language comprises YAML.

11. The system of claim 7, wherein the hardware processor configured to analyze the plurality of inventory rules to determine whether the one or more of the plurality of inventory rules is satisfied is further configured to search at least one of the header portion and the payload portion of the plurality of data packets for values matching values of corresponding parameters contained in the plurality of inventory rules.

12. The system of claim 7, wherein the hardware processor configured to identify one or more devices of the computer network is further configured to identify the one or more devices of the computer network only if a combined value of the weighting factor values of the one or more satisfied inventory rules is greater than a predefined threshold.

13. A non-transitory computer readable medium storing thereon computer executable instructions for using inventory rules to efficiently identify devices of a computer network, including instructions for:
   intercepting data traffic across one or more communication links of the computer network;
   analyzing the intercepted data traffic to determine whether one or more of a plurality of inventory rules is satisfied by the intercepted data traffic, wherein each of the plurality of inventory rules comprises one or more conditions indicating the presence of a particular computer network device having a set of parameters, wherein each one of the plurality of inventory rules has a weighting factor value indicative of a priority of the application of a corresponding rule and wherein the weighting factor value depends on previously identified devices;
   identifying one or more devices of the computer network using the weighting factor value of the one or more satisfied inventory rules; and
   wherein the plurality of inventory rules includes at least two of: i) a vendor rule listing one or more network addresses associated with each of the plurality of devices; ii) an asset rule configured to search for digital signatures identifying one or more devices and one or more parameters associated therewith; iii) a protocol rule configured to search for digital signatures to identify one or more network protocols being used by the intercepted data traffic; and iv) a fingerprint rule configured to determine one or more device parameters using digital fingerprints.

14. The non-transitory computer readable medium of claim 13, wherein the set of parameters includes at least a device identifier parameter and wherein the device identifier parameter includes at least one of: a MAC address of the device and an IP address of the device.

15. The non-transitory computer readable medium of claim 13, wherein the plurality of inventory rules are written in a formal language.

16. The non-transitory computer readable medium of claim 15, wherein the formal language comprises YAML.

17. The non-transitory computer readable medium of claim 13, wherein the instructions for analyzing the plurality of inventory rules to determine whether the one or more of the plurality of inventory rules is satisfied further comprise instructions for searching at least one of the header portion and the payload portion of the plurality of data packets for values matching values of corresponding parameters contained in the plurality of inventory rules.

* * * * *